Jan. 20, 1925.　　　　　　　　　　　　　　1,523,912

C. H. STOODY ET AL

DISK FOR ROTARY DRILL BITS

Filed June 9, 1924

Inventors.
Charles H. Stoody.
Shelley M. Stoody.
Winston F. Stoody
By Hazard and Miller
Attorneys.

Witness
W. F. Hall.

Patented Jan. 20, 1925.

1,523,912

UNITED STATES PATENT OFFICE.

CHARLES H. STOODY, SHELLEY M. STOODY, AND WINSTON F. STOODY, OF WHITTIER, CALIFORNIA.

DISK FOR ROTARY-DRILL BITS.

Application filed June 9, 1924. Serial No. 718,841.

*To all whom it may concern:*

Be it known that we, CHARLES H. STOODY, SHELLEY M. STOODY, and WINSTON F. STOODY, citizens of the United States, residing at Whittier, in the county of Los Angeles and State of California, have invented new and useful Improvements in Disks for Rotary-Drill Bits, of which the following is a specification.

This invention is a disk for rotary drill bits, and consists of the novel features herein shown, described and claimed.

An object is to make a disk cutter of common soft material and weld a body of hard material in position to form the cutting edge of the disk.

Other objects and advantages will appear from the drawings and specification.

The drawings illustrate a disk for rotary drill bits embodying the principles of my invention.

Figure 1:
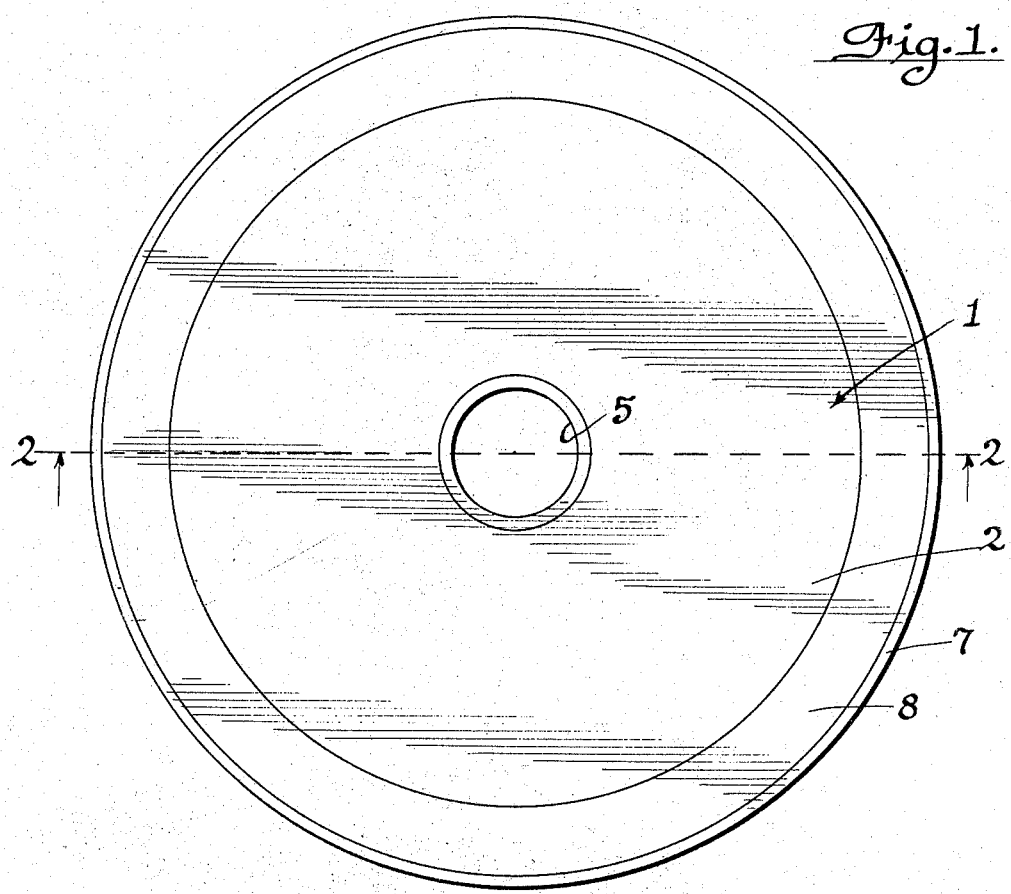
Figure 1 is a front elevation of the disk cutter.
Figure 2:
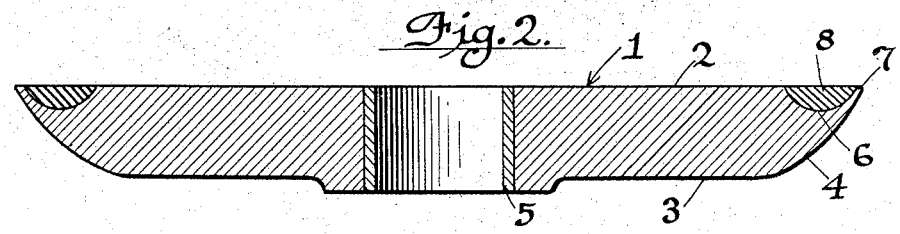
Figure 2 is a diametrical longitudinal section as on the line 2—2 of Fig. 1 and looking in the direction indicated by the arrows, and showing the disk as it is manufactured.
Figure 3:
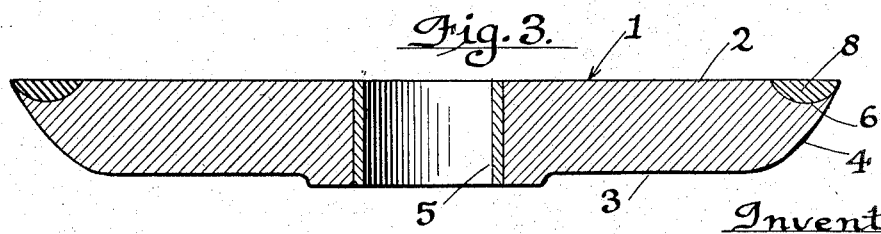
Figure 3 is a view analogous to Fig. 2 and showing the condition after the disk has been used a short time.

The details of construction shown in the drawings are as follows:

The main body 1 of the disk cutter is made of a good grade of soft steel, such as soft Bessemer steel and has a flat front face 2 and a flat rear face 3 parallel with the front face, and a curved edge 4 connecting the outer part of the face 3 with the outer part of the face 2. An axial bore is formed through the center of the disk and a hard bushing 5 is welded into the bore.

An annular groove 6 is formed from the face 2, the groove being an arc of a circle in cross section, and preferably less than half a circle, and there being a decided edge 7 at the outer side of the groove. A ring 8 is formed to fit in the groove 6 and an autogenous weld is formed to bond the ring 8 to the body 2; preferably the electric welding process is used. The ring 8 may be of manganese steel or a high grade self-hardening tool steel or a good tool steel that requires hardening. Any process and any material may be used which will produce a hard durable cutting edge.

The object in making the groove 6 in the face 2 inside of the edge 7 is to make a good seat for the insertion 8 and to protect the insertion 8 during the various handlings of the disk before actual use, and when the disk is put into hard use the edge 7 will wear away and expose the edge of the insertion 8. The soft tough steel of the body 1 will make a good mounting to hold the hard steel of the insertion 8 and the insertion 8 will be more of less self-sharpening and self-hardening until worn away.

Thus we have produced a disk cutter for rotary drills comprising a flat circular body of soft tough steel, the rear face of the body being round at its outer edge to meet the flat face of the front and there being an annular groove in the flat face inside of the edge and an insertion of hard steel welded into the groove.

Various changes may be made without departing from the spirit of the invention as claimed.

We claim:

1. A disk cutter for rotary bits comprising a body of soft tough steel having a flat front face and a flat back face and an edge rounded from the outer part of the flat back face to the outer edge of the front face, an annular groove formed from the front face inside of the edge, and an insertion of hard steel welded into the groove.

2. A disk cutter for rotary bits comprising a body of soft tough material having a flat front face and a rounded outer edge, and having a groove inside of the edge and an insertion of hard steel fitting in the groove and bonded in place.

3. A disk cutter for rotary bits comprising a body of soft Bessemer steel having a groove in its front face inside of the outer edge. and an insertion of self-hardening steel fitted into the groove and welded in place.

4. A disk cutter for rotary bits comprising a disk-like body of comparatively soft, tough steel having a flat front face, an aperture formed centrally of said body, an annular groove formed in said front face adjacent the edge thereof, and a body of comparatively hard material secured in said groove.

In testimony whereof we have signed our names to this specification.

CHARLES H. STOODY.
SHELLEY M. STOODY.
WINSTON F. STOODY.